Dec. 13, 1949     L. C. FARLEY     2,491,366
TRACTION DEVICE FOR VEHICLE WHEELS

Filed May 2, 1946     3 Sheets-Sheet 1

INVENTOR.
BY Louis C. Farley
S. Jay Teller
Attorney

Dec. 13, 1949 — L. C. FARLEY — 2,491,366
TRACTION DEVICE FOR VEHICLE WHEELS
Filed May 2, 1946 — 3 Sheets—Sheet 2

INVENTOR.
Louis C. Farley
BY S. Jay Teller
Attorney

Dec. 13, 1949     L. C. FARLEY     2,491,366
TRACTION DEVICE FOR VEHICLE WHEELS

Filed May 2, 1946     3 Sheets-Sheet 3

INVENTOR.
Louis C. Farley
BY S. Jay Teller
Attorney

Patented Dec. 13, 1949

2,491,366

UNITED STATES PATENT OFFICE 2,491,366

TRACTION DEVICE FOR VEHICLE WHEELS

Louis C. Farley, Wethersfield, Conn.

Application May 2, 1946, Serial No. 666,579

3 Claims. (Cl. 152—237)

The invention relates particularly to a traction device for a vehicle wheel of the disc type having slots at the inner face of the tire rim. The traction device is a single unit adapted to be inserted in part through one of the slots, and each wheel may be provided with a single traction device, or with a plurality of devices, as may be preferred.

The principal object of the invention is to provide a traction device of the class described which can be applied or removed quickly and conveniently and without the use of any tool.

Other and more specific objects of the invention are to provide various details of construction and arrangement which enable the before-mentioned general object to be attained.

In the drawings I have shown in detail two embodiments of the invention, but it will be understood that various changes may be made from the constructions shown, and that the drawings are not to be construed as defining or limiting the scope of the invention, the claims forming a part of this specification being relied upon for that purpose.

Figure 1:
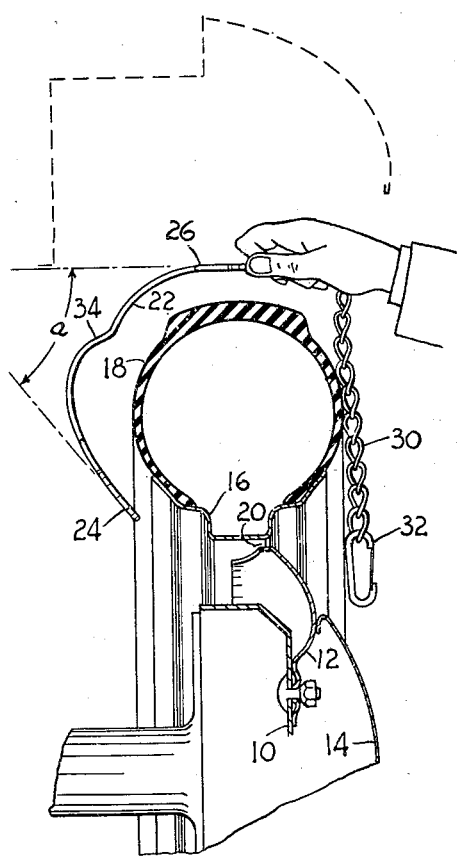
Fig. 1 is a fragmentary transverse sectional view through the wheel, rim and tire of a vehicle, this view showing one form of traction device embodying the invention about to be put in place.

Referring to the drawing, 10 represents a hub and 12 represents a disc wheel of any usual or preferred form detachably connected with the hub in any suitable manner. Detachably mounted on the disc wheel 12 is a hub cap 14. Carried by the disc wheel 12 is a tire rim 16 and mounted on the rim is a tire 18. The disc wheel 12 is formed with one or more slots 20 immediately adjacent the inner face of the rim 16. These slots 20 are ordinarily very narrow in the radial direction, but may have substantial length in the circumferential direction.

The traction device consists in part of a cross member 22 which is of such size that at least the leading or outer end portion thereof can be inserted endwise and outwardly through one of the slots 20. The cross member 22 is formed at least in part of metal so as to be strong and relatively rigid, but it is nevertheless preferably resilient so as to be flexible within narrow limits for a purpose to be described. Inasmuch as the cross rod is relatively rigid it has a substantially permanent shape. The cross member 22 is transversely curved, as shown in Fig. 1, and the length and curvature of the cross member are such that it is adapted to embrace a substantial portion of the cross section of the tire and rim assembly, particularly when the outer end portion thereof has been inserted through the slot and the cross member has been moved to its operative position. The curvature of the cross member is substantial, and as will be seen from an inspection of Fig. 1, the curvature is such that the angle $a$ between two lines drawn tangent to the respective ends of the cross member is less than 90°. In fact, the said angle $a$ is preferably very much less than 90° but it should be at least 45°.

Figure 5:
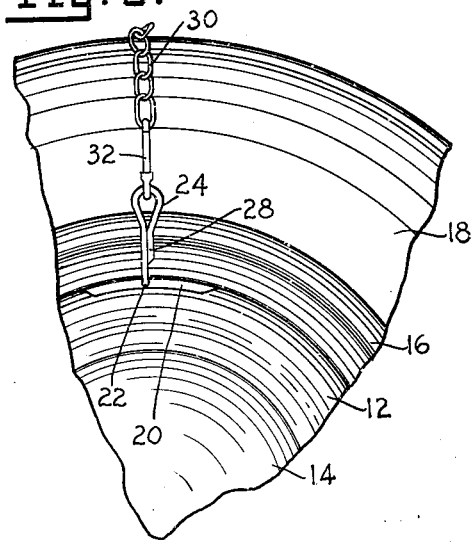
Fig. 5 is a fragmentary outer side view showing the traction device in place as illustrated in Fig. 3.

While the invention is not necessarily so limited, the cross member 22 preferably comprises a metal rod of uniform cross section. The width and thickness of the rod are equal and it is preferably circular in cross section. The rod is bent to permanently provide the desired transverse curvature, and is provided at its ends with integral loops 24 and 26. These loops extend in directions at right angles to a plane passing through the curved portion of the rod. The loop 24 at the leading or outer end is of such size that it can be readily inserted through the slot 20, and preferably the adjoining parts forming the loop are welded at 28 as shown in Fig. 5.

A short section of chain is provided which is adapted to engage the tread of the tire for traction purposes. As shown in Figs. 1 to 8, there is provided only a single chain 30, but the invention is not so limited, and the chain may consist of a composite assembly of traction means adapted to engage the tire tread. For convenient reference, particularly in the claims, the flexible traction means which is engageable with the tire tread will be designated as a "chain," but it will be understood that the term "chain" is not necessarily restricted to a single chain, as shown in Figs. 1 to 8.

When a single chain 30 is used the inner end of the said chain is suitably connected with the inner or trailing end of the cross member 22, preferably by means of the before-mentioned loop 26 which extends through one of the links of the chain. A suitable manually operable means is provided for detachably connecting the outer end of the chain with the leading or outer end portion of the cross member 22. Preferably and as shown, this means is carried by the chain at its outer end and comprises a snap link 32 which passes through one of the links of the chain 30 and which is adapted to be snapped into the loop 24 of the cross member after the said loop has been projected through the slot 20.

Figure 2:
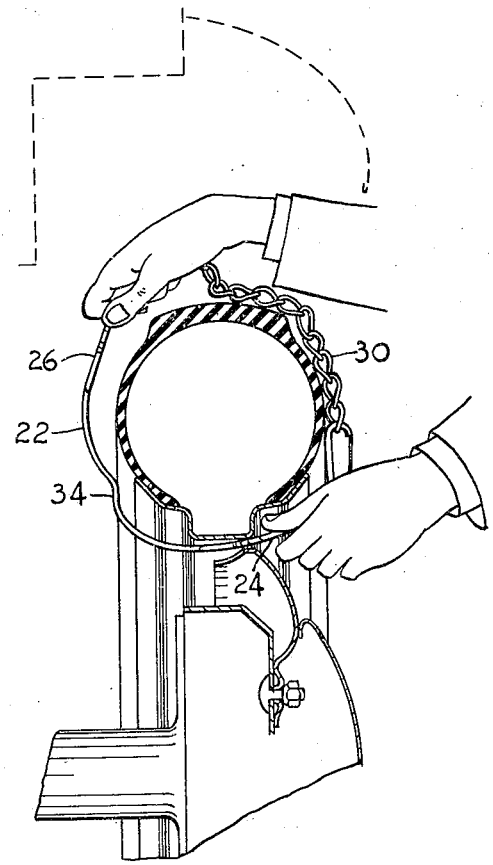
Fig. 2 is a view similar to Fig. 1 but showing the traction device partly inserted through one of the slots at the inner face of the tire rim.
Figure 3:
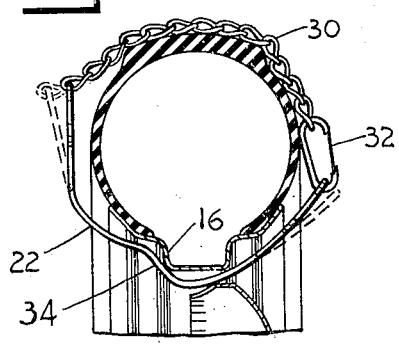
Fig. 3 is a fragmentary view similar to Figs. 1 and 2, but showing the traction device in its operative position.

In putting the traction device in place the cross member 22 is held at the trailing or inner end portion 26 thereof by one hand of the user, as shown in Fig. 1. As already stated, the length and curvature of the member are such that it is adapted to embrace a substantial portion of the tire and rim assembly, and it will be seen that with the user's hand adjacent the outer edge of the tire tread, the member reaches around at the inner side of the tire to a position adjacent the slot 20. Then the user, by moving his hand inwardly and downwardly, can move the loop 24 constituting the leading or outer end portion of the cross member into and through the slot 20 to a position wherein the said leading or outer end portion can be grasped by the other hand of the user, as shown in Fig. 2. It will be observed that in moving the cross member to the position shown in Fig. 2, the first said hand of the user remains adjacent the tread of the tire, and it is not necessary to reach substantially behind the tire. As soon as the position shown in Fig. 2 is reached the cross member can be released by the first said hand of the user, and by means of the second said hand of the user the cross member can be drawn through the slot to the operative position shown in Figs. 3, 5 and 6. When the cross member is in its operative position as shown in Fig. 3, it embraces a substantial portion of the cross section of the rim and tire assembly, and in fact it embraces approximately one-half of such cross section. It will be observed that the transverse curvature of the cross member is such that when the member is in the said operative position shown in Fig. 3 it generally conforms to the inner cross-sectional outline of the rim and tire. In this position the chain 30 is fully engaged with the tread of the tire. By means of the snap link 32 the outer end of the chain can be connected to the outer end of the cross member, the traction device being thus firmly held in place.

In order that the cross member may not be moved outwardly through the slot 20 beyond the operative position shown in Fig. 3, I preferably provide a stop for limiting such movement, and as shown, this stop comprises a hump 34 formed in the central portion of the cross member and positioned and shaped to engage the inner side of the rim 16. In order to retain the cross member 22 in its operative position during use, the hump 34 is so located that the projecting outer end portion 24 of the cross member extends toward the tire tread to a substantially lesser extent than does the inner end portion 26. This will be clear from an inspection of Fig. 3. The result is that the portion of chain, including the link 32, extending radially along the outer face of the tire, is substantially longer than the portion of chain extending radially along the inner face of the tire. Therefore, the weight of the chain at the said outer face is substantially greater than the weight of the chain at the said inner face, and the result is that in use the centrifugal action arising from the rotation of the wheel tends to centralize the chain with respect to the tire tread, thus tending to move the cross member outward through the slot 20 to the extent permitted by the hump 34. In this way the hump 34 is held in engagement with the rim and inward movement of the cross member 22 through the slot 20 is prevented.

When the traction device is to be removed the procedure already described is reversed. The first step is the releasing of the snap link 32, and then with one hand the user moves the cross member 22 inwardly to approximately the position shown in Fig. 2, so that the inner end portion thereof consisting of the loop 26 can be engaged by the other hand of the user. Then the cross member 22 is entirely withdrawn from the slot and the device is removed from the wheel, passing through the position shown in Fig. 1.

Figure 4:
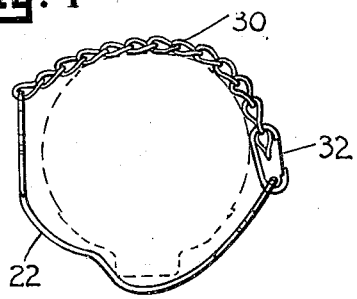
Fig. 4 is a view somewhat similar to Fig. 3 but showing only the outline of the rim and of a considerably worn tire.

It has already been stated that the cross member 22 is preferably resilient. When first inserted through the slot 20 the cross member may occupy the position shown by dotted lines in Fig. 3, and if the chain 30 is relatively short the end portions of the cross member 22 may be flexed inwardly to the positions shown by full lines in Fig. 3 in order that the snap link 32 may be engaged. By reason of its resiliency the cross member 22 tends to move outwardly to the dotted line positions, as against the pull of traction, and the section of chain 30 is thereby tensioned and held firmly in engagement with the tire tread. With a substantially worn tire, as shown in Fig. 4, there may be little or no inward flexing of the end portions of the cross member and there may be little or no tension in the chain 30. In this case it may be desirable to shorten the effective length of the chain 30, as hereinafter explained, in order that it may be tensioned by the resiliency of the cross member.

Figure 7:
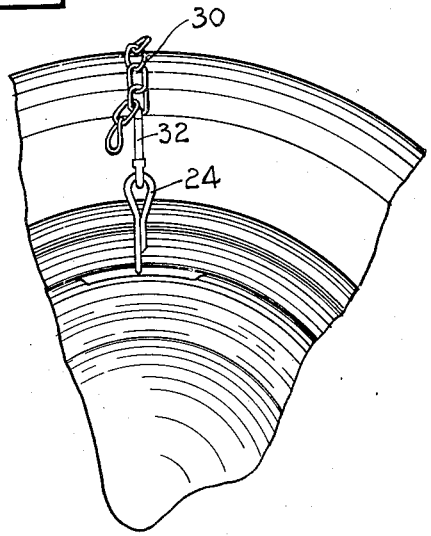
Figs. 7 and 8 are views similar respectively to Figs. 5 and 6 but showing a smaller tire and showing the traction device adjusted for such smaller tire.
Figure 6:
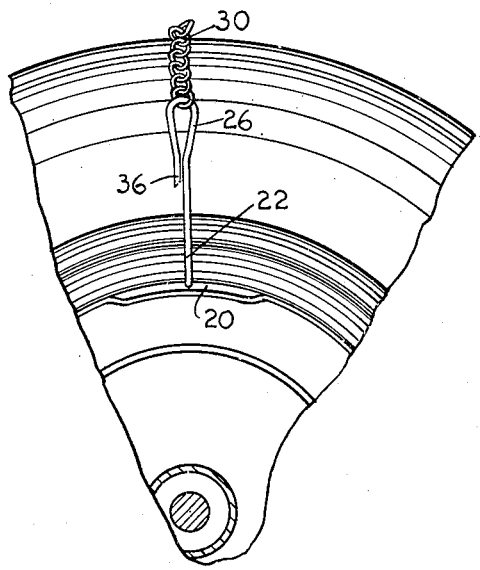
Fig. 6 is a fragmentary inner side view showing the traction device in place as illustrated in Fig. 3.
Figure 8:
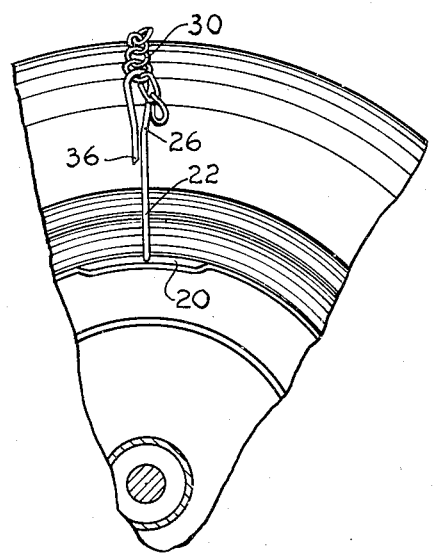

The traction device is designed for normal use on a new or only slightly worn tire of a predetermined size. However, if the device is to be used on a substantially worn tire or on a tire considerably smaller than that for which it is primarily intended, the effective length of the chain 30 can be correspondingly reduced. The effective length of the chain can be reduced at the outer end by engaging the snap link 32 in another link of the chain as indicated in Fig. 7. The effective length of the chain 30 can be reduced at the inner end by engaging the loop 26 of the metal rod with another link of the chain as indicated in Fig. 8. In order to permit this last mentioned adjustment, the loop 26 is so formed that it can be partly opened at its inner end by means of a suitable tool, in opposition to the resiliency of the metal rod forming the cross member and the loop. The adjoining parts forming the loop 26 are not welded, differing in this respect from the adjoining parts forming the loop 24. To facilitate entry of a chain link into the loop 26 the end of the metal rod forming the loop is preferably beveled as indicated at 36.

One of the important features of the traction device embodying the invention is the circular cross section of the rod of the cross member 22 which enables it to be easily pushed through or removed from the slot 20 under all possible conditions. It may sometimes happen that under excessively severe use in getting a vehicle out of mud, or up a steep icy grade, the rod of the cross member of the traction device may be permanently distorted so that one end portion or the other is bent forward or rearward with respect to the other end portion. This causes a twisting of the central portion of the rod of the cross member which extends through the slot, and if this central portion were otherwise than a single rod the twisting would create a distorted shape which might prevent movement of the cross member through the slot. However, with the central portion of the cross member, is a single rod, preferably circular in cross section, any reasonable amount of distortion can take place without in any way interfering with the free removal or reinsertion of the outer end portion of the cross member.

In the drawings I have, for the sake of convenience of illustration, shown the traction device as applied to the wheel and tire at the top thereof. With most vehicles it can be so applied and there is ample room for one hand of the user to pass beneath the edge of the fender which is indicated by dot-and-dash lines in Figs. 1 and 2. However, it is usually somewhat more convenient to apply the traction device at a slot which is near the bottom, although of course not exactly at the bottom.

Figure 9:
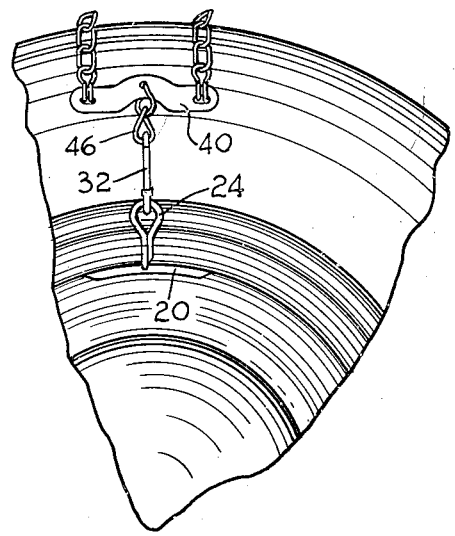
Figs. 9, 10 and 11 are views similar respectively to Figs. 5, 6 and 7, but showing an alternative embodiment of the invention.
Figure 11:
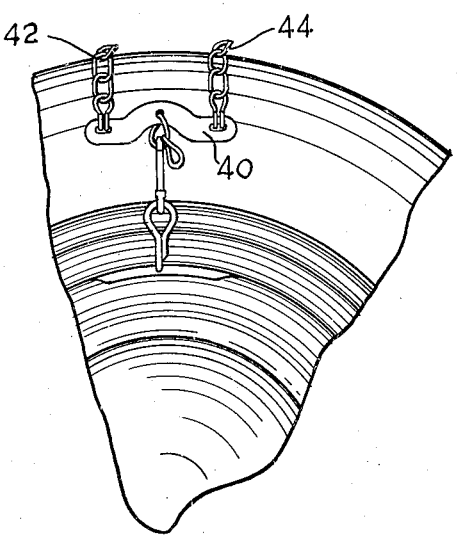
Figure 10:
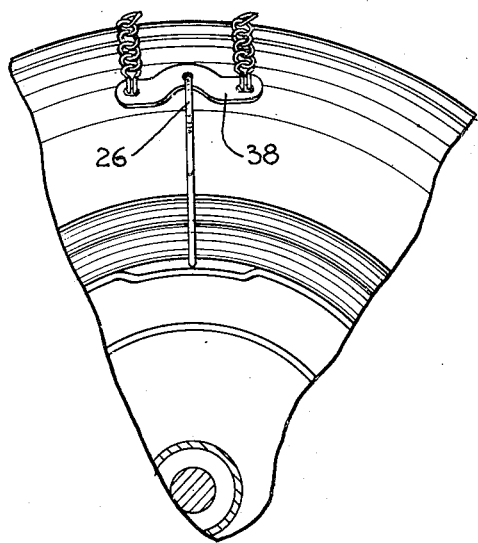

The alternative embodiment of the invention shown in Figs. 9 to 11 includes a cross member which is, essentially, the same as the cross member 22 already fully described, but ordinarily somewhat shorter, and it also includes a chain or a chain assembly which is used in lieu of the single chain 30 which is shown in Figs. 1 to 8. The manner of putting the alternative traction device in place and the manner of removing it are the same as already described and repetition is unnecessary.

The chain assembly shown in Figs. 9 to 11 comprises inner and outer equalizers 38 and 40 which are adapted to extend transversely of the central plane of the cross rod and circumferentially of the tire. The two equalizers are connected by two parallel lengths of chain 42 and 44 which are adapted to be fully engaged with the tire tread when the device is in operative position. The inner equalizer 38 is connected with the inner end of the cross rod and preferably the inner loop 26 of the rigid permanently shaped cross rod extends through a central aperture in the equalizer. A manually operable means is provided for detachably connecting the outer equalizer 40 with the outer end portion of the cross rod 22. Preferably there is provided a short length of chain 46 having the link at one end thereof extending through a central aperture in the equalizer 40, and this chain carries a snap link which is, or may be, the same as the snap link 32 shown in Figs. 1 to 8. When the device has been put in place in the manner described the snap link 32 can be engaged with the loop 24 at the outer end of the cross rod 22 to secure the entire device in place.

It will be observed from Figs. 9 and 10 that the length of the chain assembly extending radially along the outer face of the tire is substantially longer than the portion of the chain assembly extending radially along the inner face of the tire, and that the weight of the chain assembly at the said outer face is substantially greater than the weight of the chain assembly at the said inner face. The result is that in use the centrifugal action arising from the rotation of the tire wheels acts in the same manner as already described to hold the cross rod 22 in its normal operative position.

The traction device shown in Figs. 9 to 11 is designed for normal use on a new or slightly worn tire of a predetermined size. However, if the device is to be used on a substantially worn tire, or on a tire considerably smaller than that for which it is primarily intended, the effective length of the chain assembly can be correspondingly reduced. This is done by engaging the snap link 32 in another link of the chain, as indicated in Fig. 11.

From the foregoing description, it will be apparent that traction devices embodying the invention may be easily and quickly put in place and easily and quickly removed, thus making it entirely unnecessary to leave the traction devices in place under conditions such that they are not actually needed. With other traction devices as heretofore commonly used, the difficulty of attachment and removal has been so great that the practice has been for the user to leave the traction devices in place during long periods of travel over dry or cleared roads in order that they may be available for some anticipated roadway having poor traction conditions, as for instance a driveway that may not have been as well cleared of snow and ice as the main highway. Only a few seconds are required to put in place or remove traction devices incorporating the invention, and it is thus entirely feasible for the user to apply traction devices, when poor traction conditions are encountered, as for instance in an icy driveway, and then to remove the traction devices immediately after leaving the poor traction conditions, such as in the driveway, and returning to the cleared pavement.

One or more traction devices may be applied to each traction wheel of the vehicle. For brief emergency use, such as getting into or out of an icy driveway, it is ordinarily sufficient to apply only one device to each wheel. Under other conditions, as for instance when the pavements are icy, it may be preferable to apply as many traction devices to each wheel as there are slots for receiving them.

What I claim is:

1. In a traction device for a vehicle wheel of the disc type having slots at the inner face of the tire rim, the combination of a short section of chain, a transversely curved resilient cross rod of substantially permanent shape and entirely of uniform circular cross section which rod is formed with a loop at its outer end portion and is formed with a second loop at its inner end portion which passes through a link at the inner end of the chain, the length and curvature of the central portion of the said cross rod being such that it is adapted to embrace a substantial portion of the cross section of the rim and tire assembly and the said cross rod being of such size and its outer end loop being of such size and so positioned that the said outer end loop can be moved endwise and outwardly through one of the slots to an operative position wherein the cross rod partly embraces the rim and tire assembly as aforesaid and wherein the chain fully engages the tire tread and the said cross rod being provided with a stop for preventing it from moving outwardly through the slot beyond a position wherein the projecting outer end portion extends toward the tire tread to a substantially less extent than does the inner end portion, and manually operable means carried by the outer end of the chain for detachably connecting the chain with the projecting outer loop of the cross rod.

2. A traction device as set forth in claim 1, wherein the cross rod is formed with a hump for preventing it from moving outwardly through the slot beyond an operative position wherein the projecting outer end portion extends toward the tire tread to a substantially less extent than does the inner end portion.

3. In a traction device for a vehicle wheel of the disc type having slots at the inner face of the tire rim, the combination of a transversely curbed rigid cross member of substantially permanent shape having an outer end portion and an inner end portion which cross member is of such width and thickness that its outer end portion can be moved endwise and outwardly through one of the slots and which cross member is of such length and curvature that it is adapted to embrace a substantial portion of the cross-section of the rim and tire assembly, the said cross member having an integral hump thereon for preventing the said member from moving outwardly through the slot beyond a predetermined operative position wherein the projecting outer end portion extends toward the tire tread to a substantially lesser extent than does the inner end portion, and a short section of chain having its inner end connected with the inner end portion of the member and having its outer end detachably connectible with the outer end portion of the member, the said chain having the portion thereof at the outer side of the tire longer than the portion thereof at the inner side of the tire when the cross member is in the said operative position so that the chain tends by centrifugal action to move the cross member outwardly through the slot to the extent permitted by the hump and thus serves to prevent movement thereof in the opposite direction.

LOUIS C. FARLEY.

REFERENCES CITED

The following references are of record in the file of this patent:

UNITED STATES PATENTS

| Number | Name | Date |
|---|---|---|
| 999,384 | Martin | Aug. 1, 1911 |
| 1,174,254 | Jenkins | Mar. 7, 1916 |
| 1,427,003 | Lucas | Aug. 22, 1922 |
| 1,976,900 | Stahl | Oct. 16, 1934 |
| 2,080,636 | Stahl | May 18, 1937 |
| 2,118,576 | Stuller | May 24, 1938 |
| 2,224,074 | Boyer | Dec. 3, 1940 |
| 2,239,730 | Moore | Apr. 29, 1941 |
| 2,252,759 | Dodson | Aug. 19, 1941 |
| 2,420,804 | Wenzel | May 20, 1947 |